United States Patent
Beringer et al.

(10) Patent No.: US 7,634,737 B2
(45) Date of Patent: Dec. 15, 2009

(54) DEFINING A RESOURCE TEMPLATE FOR LOCATING RELEVANT RESOURCES

(75) Inventors: Joerg Beringer, Frankfurt (DE); Michael Hatscher, Osnabrueck (DE); Annette Haeussler, Heidelberg (DE)

(73) Assignee: SAP AG, Walldorf (DE)

( * ) Notice: Subject to any disclaimer, the term of this patent is extended or adjusted under 35 U.S.C. 154(b) by 344 days.

(21) Appl. No.: 10/663,365

(22) Filed: Sep. 15, 2003

(65) Prior Publication Data

US 2004/0119738 A1 Jun. 24, 2004

Related U.S. Application Data

(60) Provisional application No. 60/471,228, filed on May 16, 2003, provisional application No. 60/471,375, filed on May 16, 2003, provisional application No. 60/436,219, filed on Dec. 23, 2002.

(51) Int. Cl.
*G06F 3/048* (2006.01)
*G06F 3/00* (2006.01)
*G06F 7/00* (2006.01)
*G06F 9/46* (2006.01)

(52) U.S. Cl. .................. 715/764; 715/738; 715/739; 715/789; 707/1; 705/9

(58) Field of Classification Search .................. 715/738, 715/745, 789, 811, 739, 764; 707/1; 705/9
See application file for complete search history.

(56) References Cited

U.S. PATENT DOCUMENTS

| | | | |
|---|---|---|---|
| 5,634,127 A | 5/1997 | Cloud et al. | |
| 5,721,906 A | 2/1998 | Siefert | |
| 5,754,939 A | 5/1998 | Herz et al. | |
| 5,802,499 A | 9/1998 | Sampson et al. | |
| 5,826,239 A | 10/1998 | Du et al. | |
| 5,870,545 A | 2/1999 | Davis et al. | |
| 5,893,074 A | 4/1999 | Hughes et al. | |
| 5,899,979 A | 5/1999 | Miller et al. | |
| 6,003,011 A | 12/1999 | Sarin et al. | |
| 6,052,684 A | 4/2000 | Du | |
| 6,078,982 A | 6/2000 | Du et al. | |
| 6,167,564 A * | 12/2000 | Fontana et al. | 717/104 |
| 6,185,587 B1 | 2/2001 | Bernardo et al. | |
| 6,189,003 B1 * | 2/2001 | Leal | 707/2 |
| 6,233,600 B1 | 5/2001 | Salas et al. | |
| 6,278,977 B1 | 8/2001 | Agrawal et al. | |

(Continued)

OTHER PUBLICATIONS

Brad Hill, Yahoo! for Dummies, 2nd Edition, Publisher: IDG Books Worldwide, Inc, pp. 118, 119, and 122.*

(Continued)

*Primary Examiner*—William L Bashore
*Assistant Examiner*—Andrea N Long
(74) *Attorney, Agent, or Firm*—Finnegan, Henderson, Farabow, Garrett & Dunner, L.L.P.

(57) ABSTRACT

A method includes defining a set of attributes associated with at least one resource, determining that a resource matches the set of attributes within a context and displaying the resource as a selectable resource graphical object on a user device. The method may include defining the set of attributes by receiving information that defines an object class of the at least one resource.

18 Claims, 2 Drawing Sheets

U.S. PATENT DOCUMENTS

Figure 1:
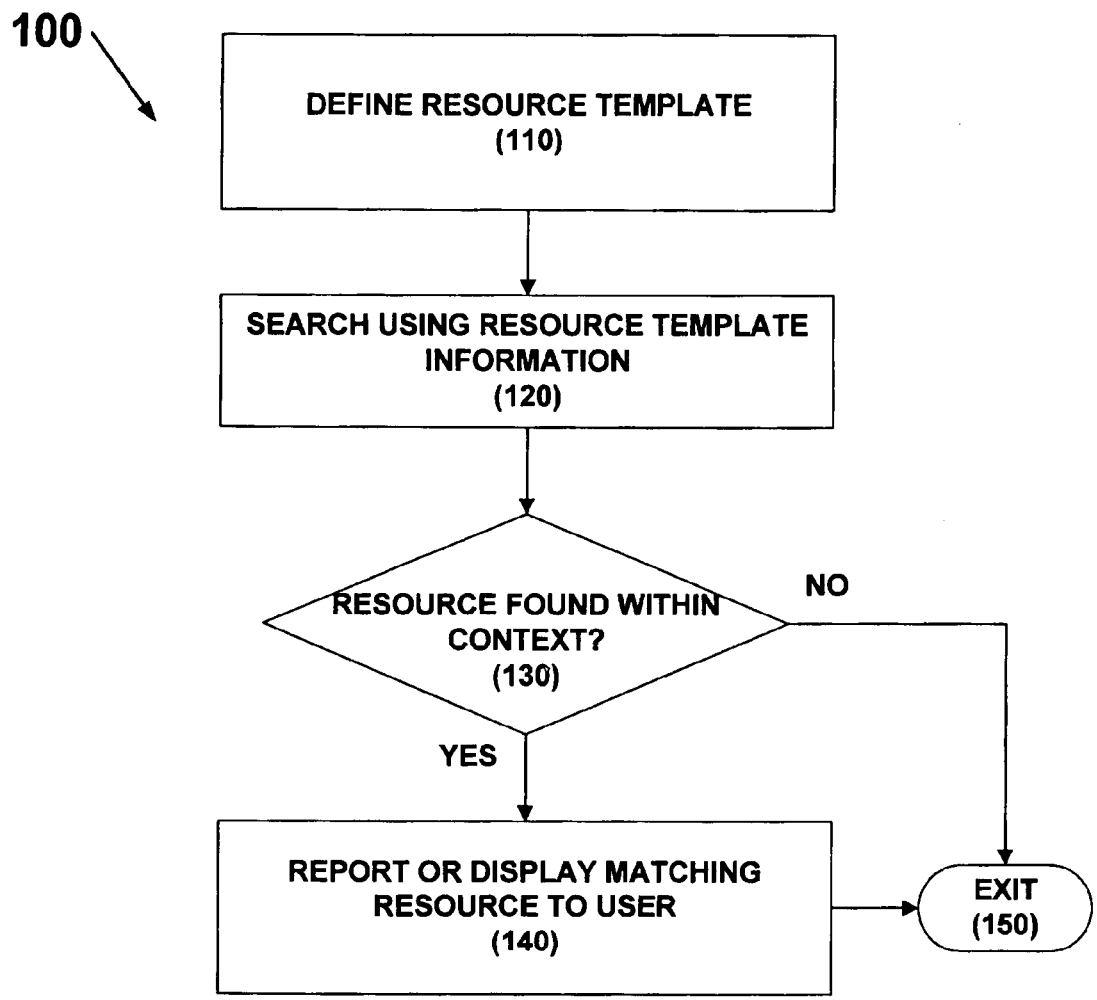

| | | | |
|---|---|---|---|
| 6,297,819 | B1 | 10/2001 | Furst |
| 6,327,628 | B1 | 12/2001 | Anuff et al. |
| 6,473,751 | B1* | 10/2002 | Nikolovska et al. ............ 707/3 |
| 6,484,149 | B1 | 11/2002 | Jammes et al. |
| 6,636,837 | B1 | 10/2003 | Nardozzi et al. |
| 6,643,661 | B2 | 11/2003 | Polizzi et al. |
| 6,668,273 | B1 | 12/2003 | Rust |
| 6,668,353 | B1 | 12/2003 | Yurkovic |
| 6,697,865 | B1 | 2/2004 | Howard et al. |
| 6,820,082 | B1 | 11/2004 | Cook et al. |
| 6,871,197 | B1 | 3/2005 | Johnson |
| 6,912,573 | B2 | 6/2005 | Ohkado et al. |
| 6,915,482 | B2 | 7/2005 | Jellum et al. |
| 6,950,852 | B1 | 9/2005 | Kobayaghi et al. |
| 6,959,268 | B1 | 10/2005 | Myers, Jr. et al. |
| 7,003,550 | B1 | 2/2006 | Cleasby et al. |
| 7,054,923 | B2 | 5/2006 | Krishnamoorthy |
| 7,124,355 | B1 | 10/2006 | Kukkal |
| 7,139,978 | B2 | 11/2006 | Rojewski et al. |
| 7,222,369 | B2 | 5/2007 | Vering et al. |
| 7,277,924 | B1 | 10/2007 | Wichmann et al. |
| 7,340,679 | B2 | 3/2008 | Botscheck et al. |
| 7,448,046 | B2* | 11/2008 | Navani et al. ............... 719/316 |
| 2002/0049749 | A1 | 4/2002 | Helgeson et al. |
| 2002/0059379 | A1 | 5/2002 | Harvey et al. |
| 2002/0073114 | A1* | 6/2002 | Nicastro et al. ............ 707/500 |
| 2002/0087600 | A1 | 7/2002 | Newbold |
| 2002/0111787 | A1* | 8/2002 | Knyphausen et al. .......... 704/2 |
| 2002/0138331 | A1 | 9/2002 | Hosea et al. |
| 2003/0023662 | A1* | 1/2003 | Yaung ....................... 709/106 |
| 2003/0023677 | A1 | 1/2003 | Morison Zuill et al. |
| 2003/0046401 | A1 | 3/2003 | Abbott et al. |
| 2003/0078830 | A1 | 4/2003 | Wagner et al. |
| 2003/0130994 | A1 | 7/2003 | Singh et al. |
| 2003/0135559 | A1 | 7/2003 | Bellotti et al. |
| 2004/0088315 | A1 | 5/2004 | Elder et al. |
| 2004/0098467 | A1 | 5/2004 | Dewey et al. |
| 2004/0119738 | A1 | 6/2004 | Beringer et al. |
| 2004/0119752 | A1 | 6/2004 | Beringer et al. |
| 2004/0122693 | A1 | 6/2004 | Hatscher et al. |
| 2004/0122696 | A1 | 6/2004 | Beringer |
| 2004/0122853 | A1 | 6/2004 | Moore |
| 2004/0128156 | A1 | 7/2004 | Beringer et al. |
| 2004/0131050 | A1 | 7/2004 | Beringer et al. |
| 2004/0133413 | A1 | 7/2004 | Beringer et al. |
| 2005/0086204 | A1* | 4/2005 | Coiera et al. .................. 707/3 |

OTHER PUBLICATIONS

Neches et al., "Collaborative Information Space Analysis Tools," D-Lib Magazine, Oct. 1998.

Cavalcanti et al., "A Logic Based Approach for Automatic Synthesis and Maintenance of Web Sites," SEKE 2002, ACM, Jul. 15-19, 2002.

Weinberg et al., "Computers in Radiology: MyPACS.net,: A Web-based Teaching File Authoring Tool," The American Journal of Roentgenology, Sep. 2002, Issue 179, pp. 579-582.

Schubert, P. et al., "Virtual Communities of Transaction: The Role of Personalization in Electronic Commerce," Global Networked Organizations, Twelfth International Bled Electronic Commerce Conference, Jun. 1999, Bled, Slovenia, pp. 1-12.

PCT International Search Report, mailed Mar. 10, 2005 (3 pages).

Yahoo! (pages documented from the Internet Archive from Dec. 17, 2001: http://web.archive.org/web/20011217201239/http://group.yahoo.com/; http://web.archive.org/web/2001121700856/help.yahoo.com/help/groups/ http://web.archive.org/web/20011202071303/help.yahoo.com/help/us/groups/groups-01.ht...; http://web.archive.org/web/20011202072641/help.yahoo.com/help/us/groups/groups-23.ht...; http://web.archive.org/web/200111127132338/dir.groups.yahoo.com/dir/Hobbies_Crafts/ http://web.archive.org/web/20011125123443/dir.groups.yahoo.com/dir/Hobbies_Crafts/; http://web.archive.org/web/200111125183404/groups.yahoo.com/group/pencil-sharpeners; http://web.archive.org/web/200111217203233/http://people.yahoo.com/).

"OnlineHobbyist.com," Austin American Statesman, Austin, Texas, Sep. 11, 2000, p. E.1.

"SAP Customers Worldwide Exploit New Business Opportunities With Web-Based Real-Time Business Solutions," (Business Wire. New York, Dec. 8, 1998, p. 1).

\* cited by examiner

DEFINING A RESOURCE TEMPLATE FOR LOCATING RELEVANT RESOURCES

CLAIM OF PRIORITY

This application claims priority to U.S. Provisional Patent Application Ser. No. 60/471,228, filed on May 16, 2003.
This application claims priority to U.S. Provisional Patent Application Ser. No. 60/471,375, filed on May 16, 2003.
This application claims priority to U.S. Provisional Patent Application Ser. No. 60/436,219, filed on Dec. 23, 2002.

DRAWING DESCRIPTIONS

Figure 2:
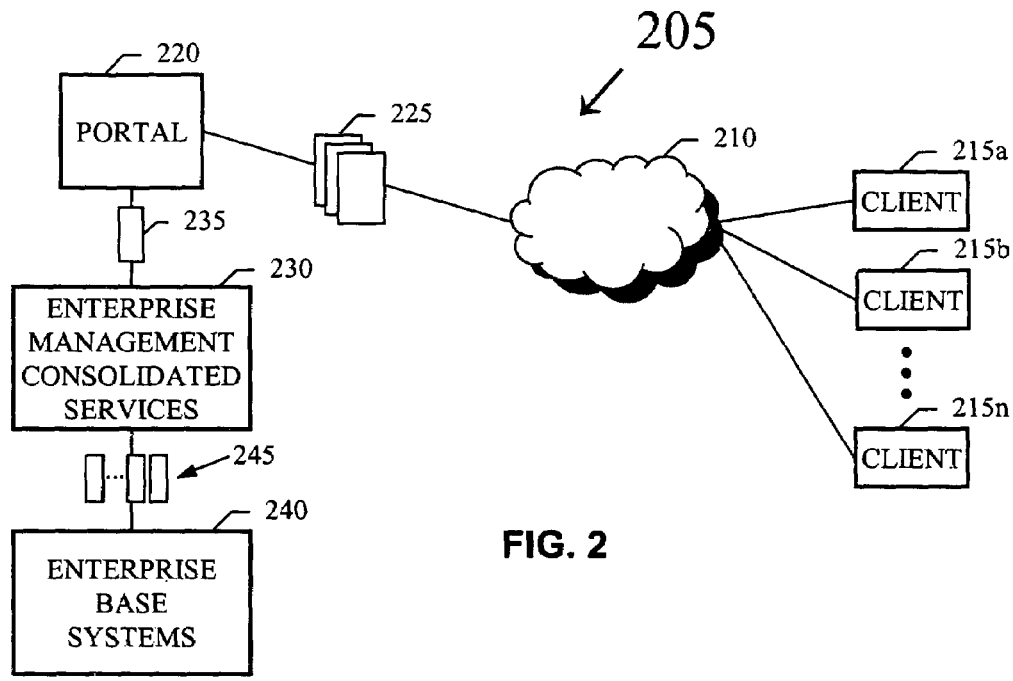
Figure 3:
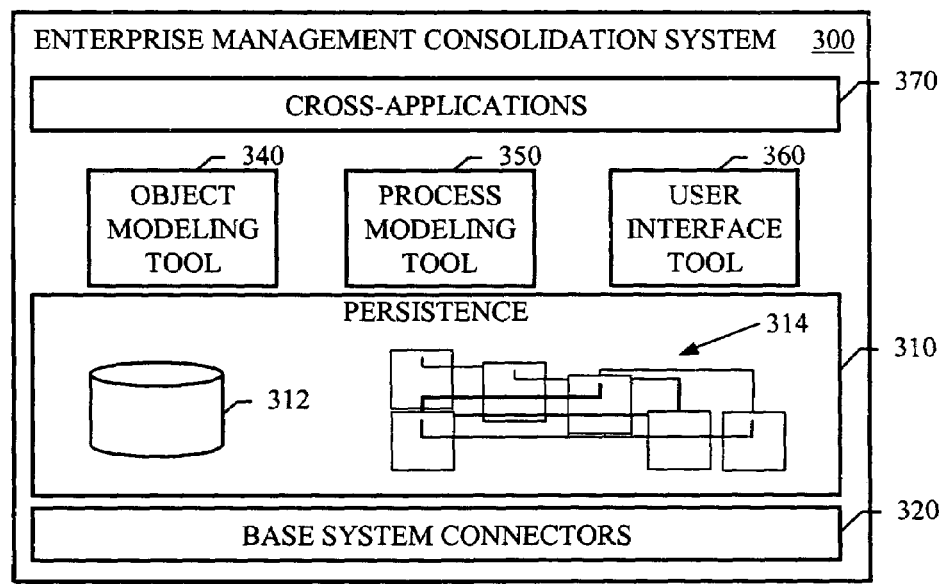

FIG. 1 is a flowchart of a resource finder process.
FIG. 2 is a block diagram illustrating an example of an integrated enterprise management system.
FIG. 3 is a block diagram illustrating components of an example enterprise management consolidation system.

BACKGROUND

The following description relates to enterprise management systems that may include applications that allow a user to find relevant resources to perform a task.

Recent developments in enterprise management systems have attempted to integrate multiple legacy systems, typically found in existing heterogeneous information technology (IT) environments, into a common enterprise management solution. Such integration technologies frequently fail to deliver a fully integrated platform that also provides sufficient flexibility to adjust to rapidly changing enterprise environments.

SUMMARY

The present application describes systems and techniques related to defining a resource template to readily locate a resource considered relevant by a user. The present inventors recognized that conventional systems do not allow a user to quickly find relevant resources.

In one aspect a method includes pre-defining a type of resource together with a set of attributes that specify constraints for what type of resource may be appropriate or desired in a given context, determining that a resource matches the set of attributes within a context and displaying the resource as a selectable resource graphical object on a user device. This pre-defined resource template generates a list of resource candidates tailored to the constraints defined in the resource template.

Details of one or more implementations are set forth in the accompanying drawings and the description below. Other features and advantages may be apparent from the description and drawings, and from the claims.

DETAILED DESCRIPTION

Users of conventional business systems may find it difficult to locate relevant resources (e.g., data, data on web-pages, and/or executable applications) required to perform a task. For example, a user of a database system may need to access executable applications and retrieve information from various sources (e.g., data stored on a computer, or a computer network).

FIG. 1 shows a resource finder process 100 that enables a user to readily locate a resource considered relevant. Process 100, which may be stored on an article comprising a tangible machine-readable medium, includes defining (110) a resource template (defining resource template information), searching (120) with the resource template information, determining (130) if a resource is found within a context that matches the resource template information, and if a matching resource is found, reporting (140) or displaying (140) the found resource to the user.

There exists a design time and a runtime for resource templates. The design time for the resource template includes defining (110) resource template information which refers to defining resource search criteria. Resource search criteria may include an object class definition that defines the type of resource, e.g., a person, group of people, a room, a conference, a hotel, etc. Resource search criteria may include attribute definitions that define attributes of the object class, for example, a size, a color, a location, a type of equipment, etc. Typically, each resource template definition has a name, for example, "pick meeting room", "book table for lunch", "schedule conference call", "find keynote speaker".

Resource templates may be implemented as files that contain textual strings. For example, the following is an example of a resource template named "pick meeting room":

```
{
Prompt = "pick meeting room"      ; Name
Class = Room                      ; Object class
Equipment = projector             ; Attribute
Size = .GEQ. 8                    ; Attribute
Building Type = Hotel             ; Attribute
}
```

This example of "pick meeting room" resource template defines an object class as "Room", and the attributes as "size", "equipment", and "building type". The constraints ".GEQ. 8", "projector", and "Hotel" are associated with the attributes "size", "equipment", and "building type", respectively.

A user may define the user or relative to the context of a current business process, e.g., limit to all persons to whom the user directs reports, or limit to rooms that are in the user's building and floor level.

The resource template for "pick meeting room" may be used in the context of a specific location. The resource template may then be used over and over in different contexts (e.g., different locations) without having to re-enter the resource template information.

A resource template may be defined by a user or administrator, for example. In some implementations a definition application may present a graphical interface that may be used interactively, for example, usable to enter textual information to define the fields of the resource template.

In some implementations, a found resource(s) may be saved to serve as a starting point for further searching. For example, a found resource(s) may subsequently be used to perform collaborative work.

A resource template may be represented by a graphical object on a computer display device, the graphical object may include the resource template name, or a part of the resource template name. In an embodiment, resource template associated to it, and which acts as a button which launches a resource finder application when activated. The resource finder application uses the resource template information associated with the resource template to search for and determine if a matching resource is available in a specific context. This corresponds to the run time of the resource template. The resource finder application allows a user to locate a relevant resource and reduces the problem of filtering through the great volume of information and resources that may be presented to a user.

The resource finder application may be implemented in conjunction with a Guided Procedures (GP) engine, which enables administrators and end-users to deal efficiently with all processes they have to participate in. The resource finder application and/or the resource template may be included as part of a step in a guided procedure. The resource templates may provide assistance within a guided procedure by limiting the set of proposed values to the pre-defined constraints. The a-priori definition of the resource constraints in a resource template may be limited to and based on the known context of the guided procedure.

The GP engine may allow functionalities such as functional task automation, streamlining and coordination of processes involving different applications and people, cross-functional and collaborative process support, and flexibility to incorporate necessary ad-hoc changes. The GP engine may include defining process flows and/or establish an execution of collaborative business processes.

The GP engine may include a context awareness feature that makes it possible to automate business process steps, for example, by defining applications, data and/or providing recommendations for decisions. The determination of a context associated with a user may be accomplished by determining a business object utilized by the user, e.g., a user that creates a purchase order for a certain product or customer.

The process flow model describes how the process steps are dependent on each other. The process flow is described in terms of phases, flow blocks and steps. Phases are used to define a sub-structure of the flow. Each phase has an owner and consists of flow blocks and steps. A flow block contains steps that are to be executed either in sequence or in parallel. Another flow block type provides a way to define alternative steps that will lead to a dynamic choice at runtime. The system may assist the user through context awareness by either automatic selection or recommendation. Steps are the lowest structure in a guided procedure. An owner is defined for each step. The owner is responsible for the completion of the step. The steps can be either mandatory or optional. An action is assigned for each step.

An action defines what is to be done in a procedure step. This actually models a process step by linking the process flow to the process context. It can be reused within lots of different guided procedures. It is defined with a workflow pattern, an application/service link, a context-aware list of needed resources (input, parameters), a context-aware list of deliverables (output), and a list of contributors as well as primary objects.

FIG. 2 is a block diagram illustrating an example integrated enterprise management system 205. Multiple clients 215a-215n may access data over a network 210 through a portal 220. The network 210 can be any communication network linking machines capable of communicating using one or more networking protocols, e.g., a local area network (LAN), a wide area network (WAN), an enterprise network, a virtual private network (VPN), and/or the Internet. The clients 215a-215n can be any machines or processes capable of communicating over the network 210. The clients 215a-215n may be implemented as Web Browsers and optionally can be communicatively coupled with the network 210 through a proxy server (not shown).

Portal 220 provides a common interface to program management services. The portal 220 receives requests from the clients 215a-215n and generates information views 225 (e.g., Web pages) in response. The portal 220 may implement a user role-based system to personalize the common interface and the information views 225 for a user of a client 215a-215n. A user can have one or more associated roles that allow personalized tailoring of a presented interface through the generated information views 225.

The portal 220 communicates with an enterprise management system 230 that consolidates multiple application services. The portal 220 may receive data 235 from the enterprise management system 230 for use in fulfilling the requests from the clients 215a-215n. The enterprise management system 230 may provide integrated application services to manage business objects and processes in a business enterprise. The business objects and processes can be resources (e.g., human resources), development projects, business programs, inventories, clients, accounts, business products, and/or business services.

The enterprise management system 230 communicates with enterprise base systems 240 to obtain multiple types of data 245. The enterprise base systems 240 may include various existing application services, such as human resource management systems, customer relationship management systems, financial management systems, project management systems, knowledge management systems, business warehouse systems, time management systems, and electronic file and/or mail systems. The enterprise base systems 240 also may include an integration tool, such as the exchange Infrastructure provided by SAP, that provides another level of integration among base systems. The enterprise management system 230 can consolidate and integrate the data and functionality of such systems into a single enterprise management tool.

This enterprise management tool can include systems and techniques to facilitate creation of new applications within the enterprise management system 230. These new applications, referred to as cross-functional or composite applications, can readily draw on the resources of the enterprise base systems 240 to cross over traditional enterprise application boundaries and handle new business scenarios in a flexible and dynamic manner, allowing rapid and continuous innovation in business process management. A virtual business cycle can be created using such cross-functional applications, where executive-level business strategy can feed management-level operational planning, which can feed employee-level execution, which can feed management-level evaluation, which can feed executive-level enterprise strategy. The information generated at each of these stages in the enterprise management cycle can be readily consolidated and presented by the enterprise management system 230 using customized cross-functional applications. The stages can provide and consume determined services that can be integrated across multiple disparate platforms.

The portal 220, enterprise management system 230 and enterprise base systems 240 may reside in one or more programmable machines, which can communicate over a network or one or more communication busses. For example, the base systems 240 may reside in multiple servers connected to an enterprise network, and the portal 220 and the enterprise management system 230 may reside in a server connected to a public network. Thus, the system can include customized, web-based, cross-functional applications, and a user of the system can access and manage enterprise programs and resources using these customized web-based, cross-functional applications from anywhere that access to a public network is available.

FIG. 3 is a block diagram illustrating components of an example enterprise management consolidation system 300. The system 300 can include a persistence layer 310 and one or more base system connectors 320. The base system connectors 320 enable data exchange and integration with base systems. The base system connectors 320 can include a BC (Enterprise Connector) interface, an ICM/ICF (Internet Communication Manager/Internet Communication Framework) interface, an Encapsulated PostScript® (EPS) interface, or other interfaces that provide Remote Function Call (RFC) capability.

The persistence layer 310 provides the enterprise management consolidation system 300 with its own database 312 and data object model 314. The database 312 and the object model 314 provide a consolidated knowledge base to support multiple enterprise management functions, including functions created as cross-applications 370. Active communication between the persistence layer 310 and the base systems can provide a tight linkage between real-time operational data from multiple base systems and an integrated enterprise analysis tool to allow strategic enterprise management and planning.

The data object model 314 can represent a subset of data objects managed by the base systems. Not all of the data aspects tracked in the base systems need to be recorded in the data object model 314. The data object model 314 may have defined relationships with data objects stored in the base systems, for example, certain objects in the data object model 314 may have read-only or read-write relationships with corresponding data objects in the base systems. These types of defined relationships can be enforced through the communication system built between the persistence layer 310 and the base systems. Thus, the persistence layer 310 may be used to effectively decouple application development from the underlying base systems.

The cross-functional applications 370, which take advantage of this decoupling from backend systems to drive business processes across different platforms, technologies, and organizations, can be created using a set of tools that enable efficient development of cross-functional applications 370. The cross-functional applications 370 may support semi-structured processes, aggregate and contextualize information, handle event-driven and knowledge-based scenarios, and support a high degree of collaboration in teams, including driving collaboration and transactions. The set of tools enable efficient development of the cross-functional applications 370 by providing application patterns that support model-driven composition of applications in a service-oriented architecture.

An object modeling tool 340 enables creation of new business objects in the persistency layer 310 by providing a mechanism to extend the data object model 314 dynamically according to the needs of an enterprise. A process modeling tool 350 enables creation of new business workflow and ad hoc collaborative workflow. A user interface (UI) tool 360 provides UI patterns that can be used to link new objects and workflow together and generate standardized views into results generated by the cross-functional applications 370. The object modeling tool 340, the process modeling tool 350 and the UI tool 360 thus can be used to build the components of cross-applications 370 to implement new enterprise management functions without requiring detailed coding activity.

The process modeling tool 350 can include guided procedure templates with pre-configured work procedures that reflect best practices of achieving a work objective that is part of a larger cross-functional application scenario. Such a work procedure can include contributions from several people, creation of multiple deliverables, and milestones/phases. Moreover, whenever an instantiated business object or work procedure has lifetime and status, the progress and status of the object or work procedure can be made trackable by the process owner or by involved contributors using a dashboard that displays highly aggregated data. The dashboard and a my ongoing work place can be two UI patterns that are provided by the UI tool 360.

Whenever there is a concept of myObjects, myRecentObjects, myRelatedObjects or myPreferredObjects, then an Object Picker UI pattern, provided by the UI tool 360, can be included that let users pick their favorite object directly. Those myObjects may be searched using the resource templates. The resource finder application may generate a recommendation list for objects using the myObjects that match the constraints defined in the resource template.

Whenever people are to be searched for, either for choosing one individual person or for generating a collection of people meeting some criterion, the people finder concept can be applied. A key aspect of searching for a person can be described as an attribute within the user's activity, qualification, interest, and collaboration profile. For a given cross-application scenario, people collections can be stored as personal or shared collections using a People Finder application to make them available for further operations later on.

Cross-functional application scenarios can provide related information to the user when possible, and some parts within a larger cross-application scenario can define what kind of related information is to be offered. For example, the match list generated by the resource finder application using a resource template may also include items that do not directly fulfill the constraints defined in the resource template, but which relate to items that do satisfy the constraints. The resource finder application may also display information that is related to constraints that are part of the resource template. For example, if a user uses a resource template to search for rooms with a projector, the resource finder application can display information about projectors in general (e.g., where to lease them, where to order them as office supply, and color schemes for presentations using projectors).

Other embodiments not described herein are also within the scope of the following claims.

What is claimed is:

1. A method comprising:

defining a set of attributes associated with at least one resource;

associating a set of constraints with the attributes, wherein the at least one resource, the defined attributes, and the associated constraints define a resource template, the resource template being configured as a resource finder;

defining a step of a business workflow using the resource template;

defining a user as an owner of the step, the user being responsible for completing the step;

locating a first resource of the at least one resource, the first resource matching the set of attributes and constraints defined in the resource template;

locating a second resource of the at least one resource, the second resource failing to match the set of constraints defined in the resource template, wherein the second resource is related to the set of attributes defined in the resource template;

displaying the first and second resources to the user as selectable resource graphical objects on a user device;

completing the step of the business workflow by selecting the selectable resource graphical object; and using a process modeling tool to monitor a status of the first resource, second resource, and the step of the business workflow, the process modeling tool enabling creation of new business workflow and collaborative workflow within an enterprise management system;

wherein the creation of new business workflow and collaborative workflow is performed in the enterprise management system that comprises cross-functional applications to manage the at least one resource, the cross-functional applications comprising:

a user interface for linking objects of an object modeling tool with the process modeling tool.

2. The method of claim 1, wherein defining the set of attributes comprises:

receiving information that defines an object class of the at least one resource.

3. The method of claim 2, further comprising:

receiving information that defines an attribute associated with the object class.

4. The method of claim 2, wherein receiving information comprises:

receiving information from the user device with a graphical display having an active area for the input of the information.

5. The method of claim 1, further comprising:

displaying a selectable template graphical object on a graphical display device prior to locating both first and second resources, the template graphical object representing an active area associated with the defined resources.

6. The method of claim 1, wherein defining the set of attributes comprises:

determining the set of attributes based on a profile of a user's interactions with the user device and an application.

7. The method of claim 1, further comprising:

receiving a selection of the resource template; and executing an application associated with the located resources.

8. The method of claim 7, wherein executing an application comprises executing the application within a guided procedure workflow.

9. The method of claim 1, wherein the first and second resources comprise at least one of an executable application, a datum or a web-page.

10. An article comprising a machine-readable medium including machine-executable instructions operative to cause a machine to:

define a set of attributes associated with at least one resource;

associate a set of constraints with the attributes, wherein the at least one resource, the defined attributes, and the associated constraints define a resource template, the resource template being configured as a resource finder;

define a step of a business workflow using the resource template;

define a user as an owner of the step, the user being responsible for completing the step;

locate a first resource of the at least one resource, the first resource matching the set of attributes and constraints defined in the resource template;

locate a second resource of the at least one resource, the second resource failing to match the set of constraints defined in the resource template, wherein the second resource is related to the set of attributes defined in the resource template;

display the first and second resources to the user as selectable resource graphical objects on a user device;

complete the step of the business workflow by selecting the selectable resource graphical object; and use a process modeling tool to monitor a status of the first resource, second resource, and the step of the business workflow, the process modeling tool enabling creation of new business workflow and collaborative workflow within an enterprise management system;

wherein the creation of new business workflow and collaborative workflow is performed in the enterprise management system that comprises cross-functional applications to manage the at least one resource, the cross-functional applications comprising:

a user interface for linking objects of an object modeling tool with the process modeling tool.

11. The article of claim 10, wherein instructions operative to cause a machine to define the set of attributes comprise instructions operative to cause a machine to:

receive information that defines an object class of the at least one resource.

12. The article of claim 11, further comprising instructions operative to cause a machine to:

receive information that defines an attribute associated with the object class.

13. The article of claim 11, wherein instructions operative to cause a machine to receive information comprise instructions operative to cause a machine to:

receive information from the user device with a graphical display having an active area for the input of the information.

14. The article of claim 10, further comprising instructions operative to cause a machine to:

display a selectable template graphical object on a graphical display device prior to locating both first and second resources, the template graphical object representing an active area associated with the defined resources.

15. The article of claim 10, wherein instructions operative to cause a machine to define the set of attributes comprise instructions operative to cause a machine to:

determine the set of attributes based on a profile of a user's interactions with the user device and an application.

16. The article of claim 10, further comprising instructions operative to cause a machine to:

receive a selection of the resource template; and execute an application associated with the located resources.

17. The article of claim 16, wherein instructions operative to cause a machine to execute an application comprise instructions operative to cause a machine to execute the application within a guided workflow.

18. The article of claim 10, wherein the resource comprises at least one of an executable application, a datum or a web-page.

* * * * *

UNITED STATES PATENT AND TRADEMARK OFFICE
CERTIFICATE OF CORRECTION

PATENT NO. : 7,634,737 B2 Page 1 of 1
APPLICATION NO. : 10/663365
DATED : December 15, 2009
INVENTOR(S) : Beringer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 636 days.

Signed and Sealed this

Twenty-first Day of December, 2010

David J. Kappos
*Director of the United States Patent and Trademark Office*